(12) United States Patent
Zentgraf et al.

(10) Patent No.: US 10,562,468 B2
(45) Date of Patent: Feb. 18, 2020

(54) WHEEL HOUSE WITH A WHEEL HOUSE COVER

(71) Applicant: Dr. Ing. h.c. F. Porsche Aktiengesellschaft, Stuttgart (DE)

(72) Inventors: Fabian Zentgraf, Ludwigsburg (DE); Eberhard Palmer, Vaihingen/Enz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 49 days.

(21) Appl. No.: 15/904,788

(22) Filed: Feb. 26, 2018

(65) Prior Publication Data

US 2018/0251083 A1    Sep. 6, 2018

(30) Foreign Application Priority Data

Mar. 1, 2017    (DE) .................. 10 2017 104 237

(51) Int. Cl.
    *B62D 25/18*    (2006.01)
    *B60R 13/04*    (2006.01)

(52) U.S. Cl.
    CPC .............. *B60R 13/04* (2013.01); *B62D 25/18* (2013.01)

(58) Field of Classification Search
    CPC ..... B62D 27/06; B62D 25/163; B62D 25/186
    USPC .................. 206/198; 280/848, 154, 853, 854
    See application file for complete search history.

(56) References Cited

U.S. PATENT DOCUMENTS

| | | | | |
|---|---|---|---|---|
| 4,169,608 A | * | 10/1979 | Logan | B62D 25/182 280/848 |
| 4,447,067 A | * | 5/1984 | Yamashita | B62D 25/161 280/848 |
| 4,687,217 A | * | 8/1987 | Stewart | B62D 29/048 280/848 |
| 4,784,430 A | * | 11/1988 | Biermacher | B60R 13/04 24/289 |
| 4,912,826 A | * | 4/1990 | Dixon | B29C 66/74 264/263 |
| 4,973,102 A | * | 11/1990 | Bien | B62D 29/048 296/187.01 |

(Continued)

FOREIGN PATENT DOCUMENTS

| | | |
|---|---|---|
| CN | 204 775 524 | 11/2015 |
| CN | 204775524 U | 11/2015 |

(Continued)

OTHER PUBLICATIONS

German Search Report dated Feb. 8, 2018.

*Primary Examiner* — Jeffrey J Restifo

(74) *Attorney, Agent, or Firm* — Gerald E. Hespos; Michael J. Porco; Matthew T. Hespos

(57) ABSTRACT

A wheel house cover (2) for a wheel house (1) of a motor vehicle (4) has a basic body (13) defining a segment of a circular ring with an outer side (14) and an inner side (15). The wheel house cover (2) is fastened to a body sheet (5) so that the outer side (14) is visible. The rear side (15) of the wheel house cover (2) has fastening crosspieces (16) each of which has a fastening opening (8, 17) and a fastening protrusion (18). The fastening opening (8, 17) receives a fastening element (10) to achieve interlocking connection of the wheel house cover (2) to the body sheet (5). The fastening protrusion (18) engages in a positioning opening (9, 19) of the body sheet (5) to position the wheel house cover (2) relative to the body sheet (5).

10 Claims, 3 Drawing Sheets

(56) References Cited

U.S. PATENT DOCUMENTS

| | | | | |
|---|---|---|---|---|
| 5,098,765 | A * | 3/1992 | Bien | B62D 29/048 293/155 |
| 5,139,306 | A * | 8/1992 | Ott | B60R 13/04 24/290 |
| 5,226,695 | A * | 7/1993 | Flint | B60R 19/24 296/191 |
| 5,228,742 | A * | 7/1993 | Johnson | B62D 29/048 296/183.1 |
| 5,238,268 | A * | 8/1993 | Logan | B62D 25/18 280/154 |
| 5,271,658 | A * | 12/1993 | Haldenwanger | B62D 25/16 296/191 |
| 5,314,280 | A * | 5/1994 | Gagliardi | B62D 25/163 29/525.02 |
| 5,340,154 | A * | 8/1994 | Scott | B62D 25/18 280/154 |
| 5,613,710 | A * | 3/1997 | Waner | B62D 25/161 280/848 |
| 5,697,644 | A * | 12/1997 | Logan | B60R 13/04 280/848 |
| 5,879,045 | A * | 3/1999 | Logan | B62D 25/161 280/770 |
| 6,070,908 | A * | 6/2000 | Skrzypchak | B60R 13/04 280/847 |
| 6,205,642 | B1 * | 3/2001 | Czirmer | B62D 25/18 280/154 |
| 6,769,727 | B2 * | 8/2004 | Delavalle | B62D 25/163 293/120 |
| 6,929,313 | B2 * | 8/2005 | Fries | B62D 25/161 296/193.05 |
| 6,959,948 | B2 * | 11/2005 | Varnhagen | B60R 13/04 280/849 |
| 7,001,128 | B2 * | 2/2006 | Kuntze | F16B 5/0642 24/297 |
| 7,104,594 | B2 * | 9/2006 | Granger | B60R 13/04 24/297 |
| 7,329,032 | B2 * | 2/2008 | Verwaerde | B60Q 1/0433 296/198 |
| 7,413,239 | B2 * | 8/2008 | Mitsuyama | B62D 25/163 296/187.04 |
| 7,488,032 | B2 * | 2/2009 | Thakar | B62D 25/161 296/191 |
| 7,651,158 | B2 * | 1/2010 | Koizumi | B62D 25/08 296/146.15 |
| 7,866,738 | B2 * | 1/2011 | Andou | B62D 25/088 296/193.05 |
| 7,984,944 | B2 * | 7/2011 | Mildner | B62D 25/16 296/198 |
| 8,029,049 | B2 * | 10/2011 | Ito | B62D 25/163 296/191 |
| 8,087,721 | B2 * | 1/2012 | Kralevich | B60R 21/34 296/191 |
| 8,118,329 | B2 * | 2/2012 | Braga | B62D 25/18 280/848 |
| 8,146,987 | B2 * | 4/2012 | Uchino | B62D 25/161 296/198 |
| 8,434,816 | B2 * | 5/2013 | Tanaka | B62D 25/24 280/849 |
| 8,469,442 | B1 * | 6/2013 | Pencak | B62D 25/14 296/187.12 |
| 8,608,238 | B2 * | 12/2013 | Tanaka | B62D 25/24 296/193.06 |
| 8,820,822 | B2 * | 9/2014 | Witkop | B62D 25/161 280/850 |
| 8,979,166 | B2 * | 3/2015 | Yamanaka | B62D 25/163 296/146.15 |
| D744,385 | S * | 12/2015 | Harriton | D12/169 |
| 9,598,115 | B2 * | 3/2017 | Mildner | B60K 15/05 |
| 9,862,334 | B2 * | 1/2018 | Mukhtar | B60R 13/04 |
| 10,059,379 | B2 * | 8/2018 | Mason | B62D 25/182 |
| 2002/0158460 | A1 * | 10/2002 | Logan | B60R 13/04 280/848 |
| 2009/0167011 | A1 * | 7/2009 | Braga | B60R 13/04 280/848 |

FOREIGN PATENT DOCUMENTS

| | | |
|---|---|---|
| DE | 600 09 465 | 3/2005 |
| DE | 10 2009 042 845 | 3/2011 |
| EP | 2 423 080 | 2/2012 |

* cited by examiner

WHEEL HOUSE WITH A WHEEL HOUSE COVER

CROSS REFERENCE TO RELATED APPLICATION

This application claims priority under 35 USC 119 to German Patent Appl. No. 10 2017 104 237.7 filed on Mar. 1, 2017, the entire disclosure of which is incorporated herein by reference.

BACKGROUND

Field of the Invention

The invention relates to a wheel house with a wheel house cover, and to a wheel house cover of a motor vehicle.

Description of the Related Art

Motor vehicles have a body that forms wheel houses to accommodate the wheels of the motor vehicle. The wheels with their running gear are accommodated in the wheel houses in a suspended and damped manner and optionally also steerable manner. Wheel house covers may be fastened to a body sheet to form a transition from the wheel house to a wing or side part of the vehicle.

EP 2 423 080 discloses a wheel house with a wheel house cover fastened to a body sheet. Protruding eyelet elements are formed both on the body sheet and on the wheel house cover, and a fastening clip is pushed through the eyelet elements to achieve an interlocking connection between the wheel house cover and the body sheet. Plural eyelet elements are arranged along the wheel house cover to achieve a stable defined arrangement of the wheel house cover on the body sheet.

DE 10 2009 042 845 A1 discloses a wheel house cover that also is fastened to the body sheet by fastening clips. For this purpose, both the body sheet and the wheel house cover have corresponding openings.

A tolerance situation of the wheel house cover of the prior art may cause an undefined, undesired position of the wheel house cover with respect to the body sheet.

It is therefore the object of the invention to provide a wheel house with a wheel house cover, and to provide a wheel house cover of simple design and to ensure a defined position of the wheel house cover relative to the body sheet.

SUMMARY

The invention relates to a wheel house cover for a wheel house of a motor vehicle. The wheel house cover has a basic body that is substantially in the form of a segment of a circular ring with a visible side and a rear side. The wheel house cover is fastenable with the rear side to a body sheet such that the visible side is visible. The rear side of the wheel house cover is provided with fastening crosspieces that have a fastening opening and a fastening protrusion. The fastening opening serves for the interlocking connection of the wheel house cover to the body sheet by means of a fastening element, and the fastening protrusion engages in a positioning opening of the body sheet to position the wheel house cover relative to the body sheet. As a result, the wheel house cover can be fastened to the body sheet in a secure and positionally correct manner. The fastening protrusion can provide at least a slight pretension between the wheel house cover and the body sheet to improve the positioning.

The fastening protrusion may have a T-shape formed by three protruding ribs. Two of the ribs may define a surface or plane and the third rib is perpendicular or normal thereto. As a result, the first and second ribs can be positioned against an edge of the positioning opening, and the third rib can be supported on an opposite edge.

At least one rib may taper from a base on the wheel house cover toward the free end of the fastening protrusion to produce a ramp that can bring about bracing of the wheel house cover. The third rib also is referred to as a coordinating rib because it produces a pretension between the wheel house cover and the body sheet.

The fastening opening and the fastening protrusion may be adjacent to each other on the fastening crosspiece. As a result, in addition to the fastening of the wheel house cover by means of the fastening crosspiece, the bracing is undertaken directly adjacent to the fastening. This makes it possible to avoid or reduce unintentional effects due to an expansion of the wheel house cover.

Spacer ribs may be provided on the fastening crosspiece. The spacer ribs advantageously may be arranged adjacent to the fastening opening and/or to the dome. The spacer ribs may be placed against the body sheet, and therefore a defined distance between the body sheet and the wheel house cover is predetermined. The geometrical arrangement of the spacer ribs assures a uniformly distributed transmission of force between the wheel house cover and the body sheet.

The spacer ribs may be of rectilinear design, and individual spacer ribs or all of the spacer ribs may be parallel and/or perpendicular to one of the protruding ribs of the fastening protrusion. Thus, good distribution of forces can be achieved. The spacer ribs also form a framework for stabilizing the wheel house cover.

One spacer rib may be between the fastening protrusion and the fastening opening and may be parallel to the first and second ribs of the fastening protrusion.

The spacer ribs may have a first height (h) and the fastening protrusion may have a second height (H). The second height (H) may be greater than the first height (h). The effect achieved by this is that the fastening protrusion always engages in the positioning opening, even if the spacer ribs lie in contact against the body sheet.

The basic body may be of L- or C-shape. The basic body of the wheel house cover can thus be inserted in a drawn-back region of the body sheet, and therefore a type of joint of zero joint is formed between the body sheet and the wheel house cover.

The invention also relates to a wheel house with the above-described wheel house cover. The wheel house may have a body sheet with a region that is substantially in the shape of a segment of a circular ring and has plural opening pairs. The opening pairs have a fastening opening and a positioning opening. A circular ring does not strictly have to be provided for the feature of the region in the shape of a circular ring. Certain deviations therefrom should also be regarded as such a region.

The body sheet may be tapered so that it at least partially accommodates the wheel house cover. The effect achieved by this is that the wheel house cover can be arranged approximately flush or with an excess length or recess with respect to the wing or side part. The recess or the excess length can optionally also only be small.

The invention is explained in detail below using an exemplary embodiment with reference to the drawing.

DETAILED DESCRIPTION

FIGS. 1 to 7 show a wheel house 1 with a wheel house cover 2 in various views or details thereof.

Figure 1:
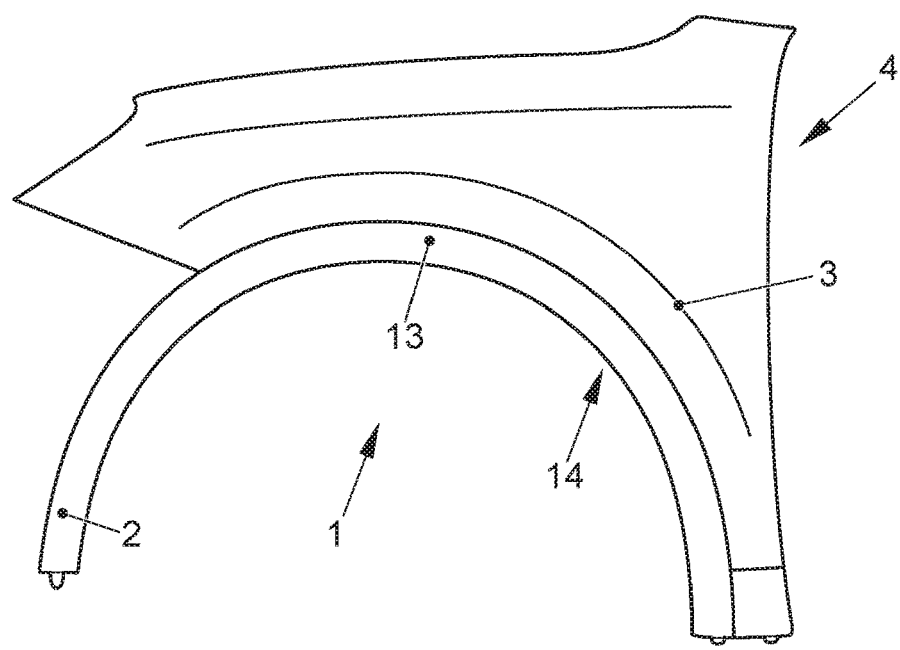
FIG. 1 is a schematic illustration of a wheel house with a wheel house cover.
Figure 2:
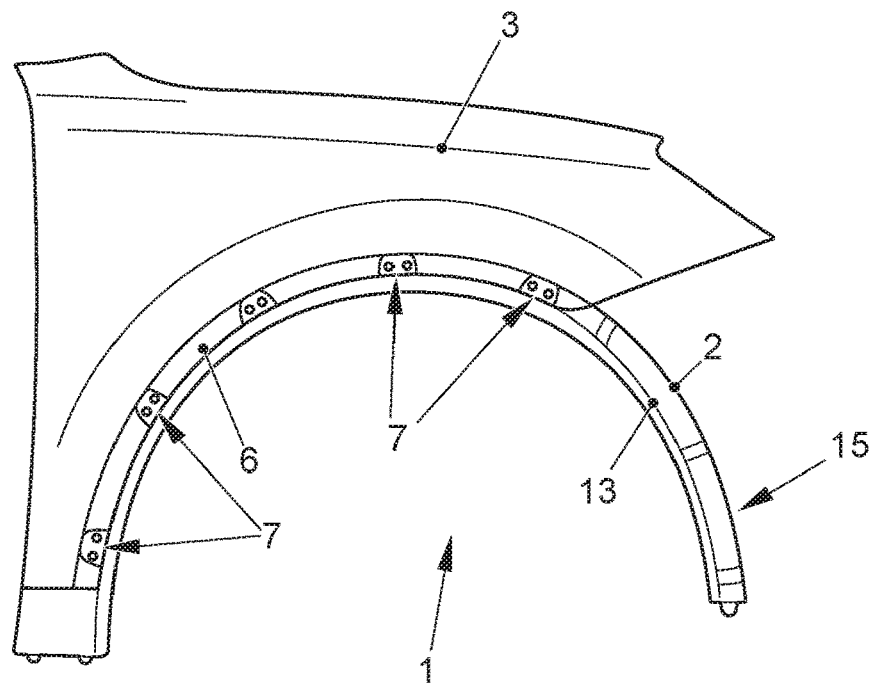
FIG. 2 is a schematic illustration of a wheel house with a wheel house cover, as viewed from the rear.
Figure 3:
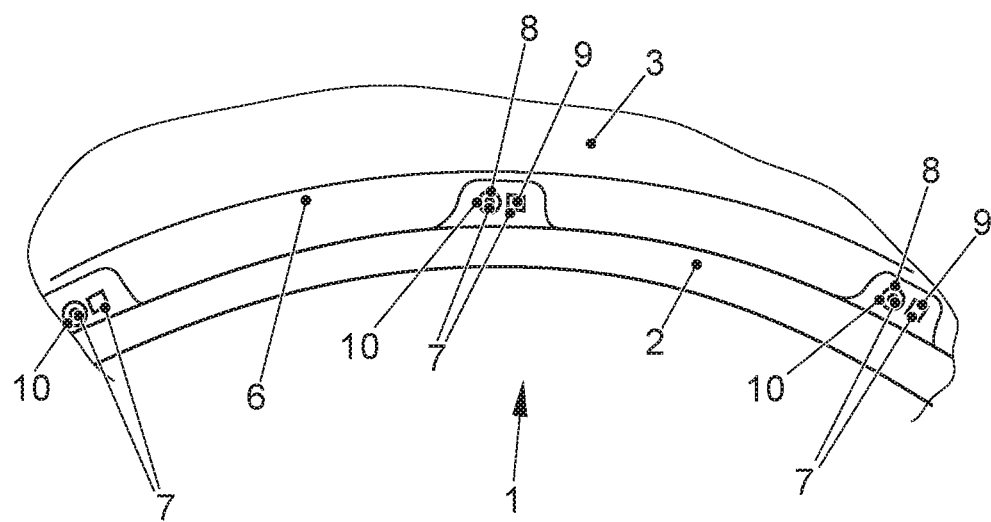
FIG. 3 shows a detail of the view in FIG. 2.
Figure 4:
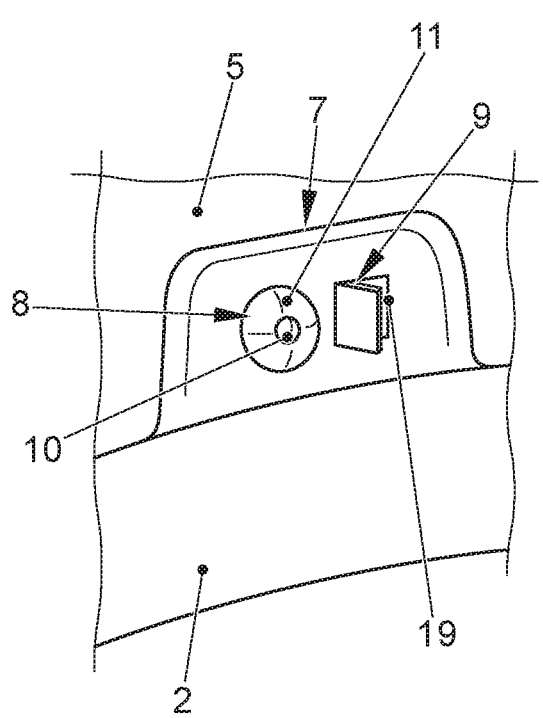
FIG. 4 is an enlarged illustration of a detail from FIG. 3.

FIGS. 1 to 3 show a wheel house 1 of a front wing 3 of a motor vehicle 4. Alternatively and synonymously, a rear wheel house 1 of a side part of a motor vehicle can also be meant, but this is not explicitly shown. The front wheel house is explained by way of representation of all of the wheel houses of a motor vehicle.

FIG. 1 shows the wheel house 1 and the wheel house cover 2 from the side view, i.e. viewed from a distance from the motor vehicle 4. FIGS. 2 and 3 show the wheel house 1 and the wheel house cover 2 from the rear side.

The wheel house 1 has a body sheet 5, which, for example, forms the wing or a side part. However, the body sheet 5 can be formed separately therefrom.

As shown in FIGS. 1 to 3, the body sheet 5 has a region 6 that is substantially in the shape of a segment of a circular ring and has opening pairs 7. Each opening pair 7 has a fastening opening 8 and a positioning opening 9.

A circular ring does not strictly have to be perfectly circular, and certain deviations therefrom should also be regarded as such a region.

The fastening openings 8 cannot be seen directly in FIGS. 2 and 3 because a fastening element 10 already is inserted into each of the fastening openings 8 to fasten the wheel house cover 2 to the body sheet 5.

FIG. 4 shows this once again in an enlarged view. The round head 11 of the fastening element 10 that is used for connecting the wheel house cover 2 to the body sheet 5 is shown. The fastening element here is, for example, a clip that is inserted through a fastening opening in the wheel house cover and through a corresponding opening in the body sheet.

Figure 5:
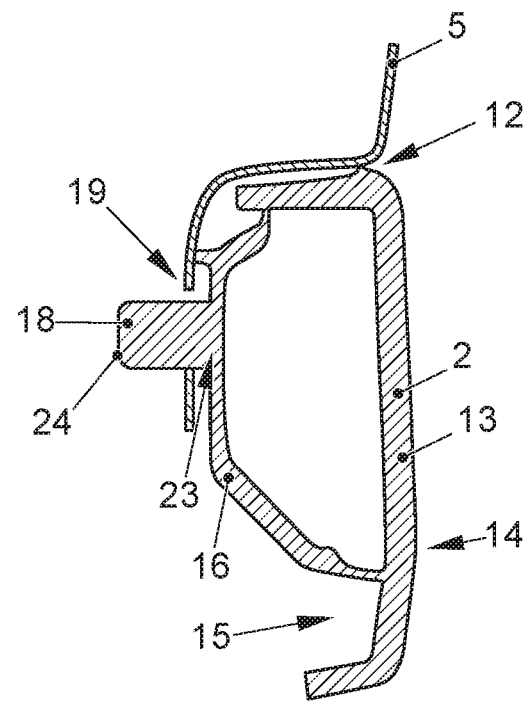
FIG. 5 is a sectional view through a body sheet and the wheel house cover.

The body sheet 5 is tapered in an approximate s shape for at least partially accommodating the wheel house cover 2, as shown in FIG. 5. The effect can thus be achieved that the wheel house cover 2 can be arranged approximately flush or with an excess length or recess with respect to the wing or side part. The recess or the excess length optionally can be small. A joint 12, for example a zero joint, is formed between the wheel house cover 2 and the body sheet 5.

The invention also relates to a wheel house cover 2 for a wheel house 1 of a motor vehicle. The wheel house cover 2 is formed with a basic body 13 that is substantially in the shape of a segment of a circular ring and has an outer side 14 and an inner side 15. The wheel house cover 2 can be fastened with the inner side 15 facing a body sheet 5 so that the outer side 14 is visible.

Figure 6:
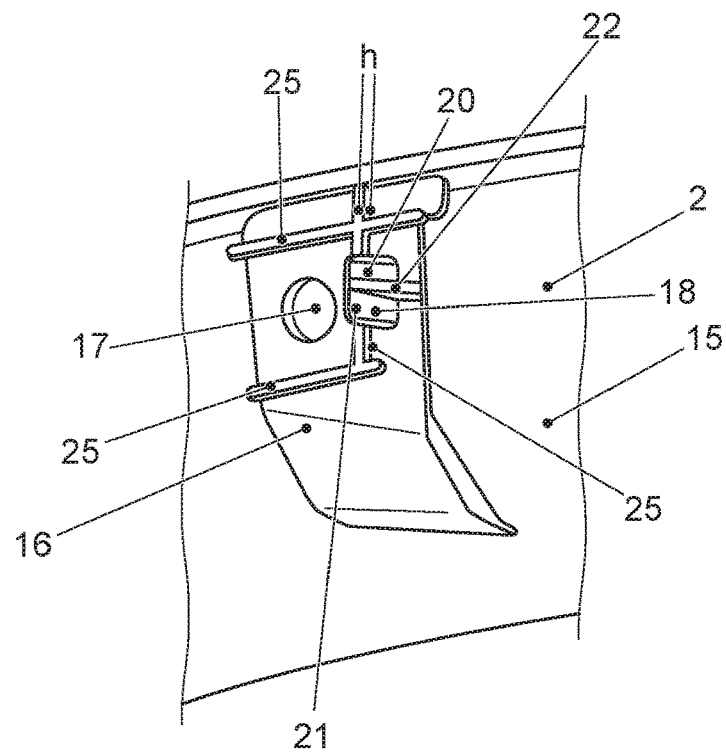
FIG. 6 is a perspective view of a wheel house cover from the rear.
Figure 7:
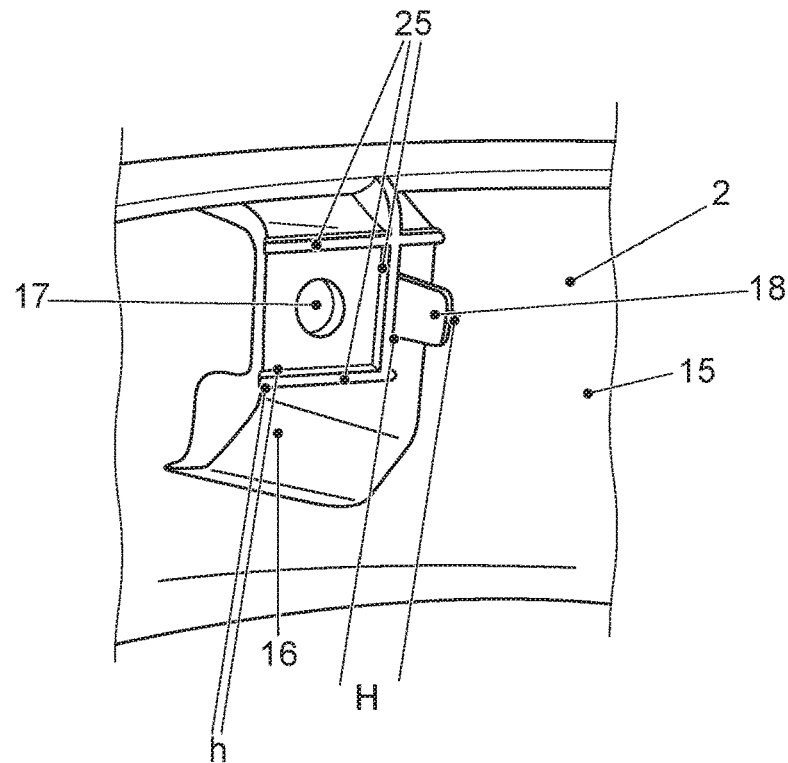
FIG. 7 is a further perspective view of a wheel house cover from the rear.

FIGS. 6 and 7 show that a fastening crosspiece 16 is provided on the inner side 15 of the wheel house cover 2. Such fastening crosspieces 16 are provided along the wheel house cover 2. Each fastening crosspiece 16 has a fastening opening 17 and a fastening protrusion 18. The fastening opening 17 serves for the interlocking connection of the wheel house cover 2 to the body sheet 5 by means of a fastening element 10. The fastening protrusion 18 engages in a positioning opening 19 of the body sheet 5 for positioning the wheel house cover 2 relative to the body sheet 5. As a result, the wheel house cover 2 can be fastened to the body sheet 5 in a secure and positionally correct manner. The fastening protrusion 18 provides at least a slight pretension between the wheel house cover 2 and the body sheet 5 and thereby improves the positioning.

FIGS. 6 and 7 show that the fastening protrusion 18 has a T-shaped structure formed by three protruding ribs 20, 21, 22. Two ribs 20, 21 are in a common plane, and the third rib 22 is perpendicular to that plane. As a result, the first and second ribs 20, 21 can be positioned against a first edge of the positioning opening 19, and the third rib 22 can be supported on a second edge of the positioning opening 19 that is opposite the first edge to achieve a pretension between the wheel house cover 2 and the body sheet 5.

At least one of the rib 20, 21 and/or 22 may taper from a base 23 on the wheel house cover 2 toward the free end 24 of the fastening protrusion 18 to produce a ramp that can bring about bracing of the wheel house cover 2 when the fastening protrusion 18 is inserted into the positioning opening 19. The third rib 22 also is referred to as a coordinating rib because it produces a pretension between the wheel house cover 2 and the body sheet 5.

The fastening opening 17 and the fastening protrusion 18 are adjacent to each other on the fastening crosspiece 16. In addition to the fastening of the wheel house cover 2 by means of the fastening crosspiece 16, the bracing thereby also is provided directly adjacent to the fastening. It is thereby possible to avoid or reduce unintentional effects because of an expansion of the wheel house cover.

Spacer ribs 25 protrude from the fastening crosspiece 16 in the direction toward the body sheet 5 as shown in FIGS. 6 and 7. The spacer ribs 25 are adjacent to the fastening opening 17 and to the fastening protrusion 18. FIGS. 6 and 7 also show that the spacer ribs 25 are arranged in a geometrical arrangement with respect to one another, such as at right angles and/or parallel to one another. The spacer ribs 25 are positioned against the body sheet 5, so that a defined distance between the body sheet 5 and the wheel house cover 2 is predetermined. The geometrical arrangement of the spacer ribs 25 also achieves a uniform distribution of force between the wheel house cover 2 and the body sheet 5.

As illustrated in FIG. 6 or 7, the spacer ribs 25 are rectilinear, and individual spacer ribs or all of the spacer ribs 25 are arranged parallel and/or perpendicular to one of the protruding ribs of the fastening protrusion 18 to achieve a good distribution of forces. The spacer ribs 25 also form a framework for stabilizing the wheel house cover 2.

FIGS. 6 and 7 also show that one of the spacer ribs 25 is arranged between the fastening protrusion 18 and the fastening opening 17. This spacer rib advantageously runs parallel to the first and second ribs 20, 21 of the fastening protrusion 18.

The spacer ribs 25 have a first height (h) and the fastening protrusion 18 has a second height (H) that is greater than the first height (h). Thus, the fastening protrusion 18 always engages in the positioning opening 19, even if the spacer ribs 25 contact the body sheet 5.

The basic body 13 is of C-shape, as shown in FIG. 5. As an alternative, the basic body 13 could be L-shaped. As a result, the basic body 13 of the wheel house cover 2 can be inserted in a drawn-back region of the body sheet 5, and therefore a zero joint 12 is formed between the body sheet 5 and the wheel house cover 2.

The fastening crosspiece 16 also is approximately C-shaped, and therefore a clearance remains between the fastening crosspiece 16 and the wheel house cover 2 to accommodate the fastening element 10.

LIST OF REFERENCE SIGNS

1 Wheel house
2 Wheel house cover
3 Front wing
4 Motor vehicle
5 Body sheet
6 Region in the shape of a segment of a circular ring
7 Opening pairs
8 Fastening opening
9 Positioning opening
10 Fastening element
11 Head
12 Joint
13 Basic body in the shape of a segment of a circular ring
14 Outer side
15 Inner side
16 Fastening crosspiece
17 Fastening opening
18 Fastening protrusion
19 Positioning opening
20 First rib
21 Second rib
22 Third rib
23 Base
24 Free end
25 Spacer ribs

What is claimed is:

1. A wheel house cover for a wheel house of a motor vehicle, comprising: a basic body substantially in the form of a segment of a circular ring with an outer side and with an inner side, the wheel house cover being fastenable to a body sheet such that the outer side is visible, the inner side of the wheel house cover being provided with fastening crosspieces that include a fastening opening and a fastening protrusion, the fastening opening being configured to receive a fastening element for interlocking connection of the wheel house cover to the body sheet, and the fastening protrusion engaging in a positioning opening of the body sheet to position the wheel house cover relative to the body sheet, the fastening protrusion has a T-shape formed by three protruding ribs.

2. The wheel house cover of claim 1, wherein the fastening opening and the fastening protrusion are adjacent to each other on the fastening crosspiece.

3. The wheel house cover of claim 1, wherein the spacer ribs are rectilinear, and at least one of the spacer ribs is parallel or perpendicular to at least one of the protruding ribs of the fastening protrusion.

4. The wheel house cover of claim 3, wherein one of the spacer ribs is between the fastening protrusion and the fastening opening.

5. The wheel house cover of claim 1, wherein the basic body is of L-shape or C-shape.

6. A wheel house, comprising: the wheel house cover of claim 1, and a body sheet defining a segment of a circular ring, the body sheet having opening pairs, each of the opening pairs having a fastening opening and a positioning opening.

7. The wheel house of claim 6, wherein the body sheet is tapered to at least partially accommodate the wheel house cover.

8. A wheel house cover for a wheel house of a motor vehicle, comprising: a basic body substantially in the form of a segment of a circular ring with an outer side and with an inner side, the wheel house cover being fastenable to a body sheet such that the outer side is visible, the inner side of the wheel house cover being provided with fastening crosspieces that include a fastening opening and a fastening protrusion, the fastening opening being configured to receive a fastening element for interlocking connection of the wheel house cover to the body sheet, and the fastening protrusion engaging in a positioning opening of the body sheet to position the wheel house cover relative to the body sheet, and spacer ribs on the fastening crosspiece, the spacer ribs being adjacent to at least one of the fastening opening and the fastening protrusion.

9. The wheel house cover of claim 8, wherein the fastening protrusion has a T-shape formed by three protruding ribs.

10. The wheel house cover of claim 8, wherein the spacer ribs have a first height (h) and the fastening protrusion has a second height that is greater than the first height (h).

\* \* \* \* \*